June 11, 1968 S. SABADISHIN 3,387,372
PICTORIAL PLOTTING BOARD AND RELATED PLOTTING DEVICE
Filed July 19, 1965
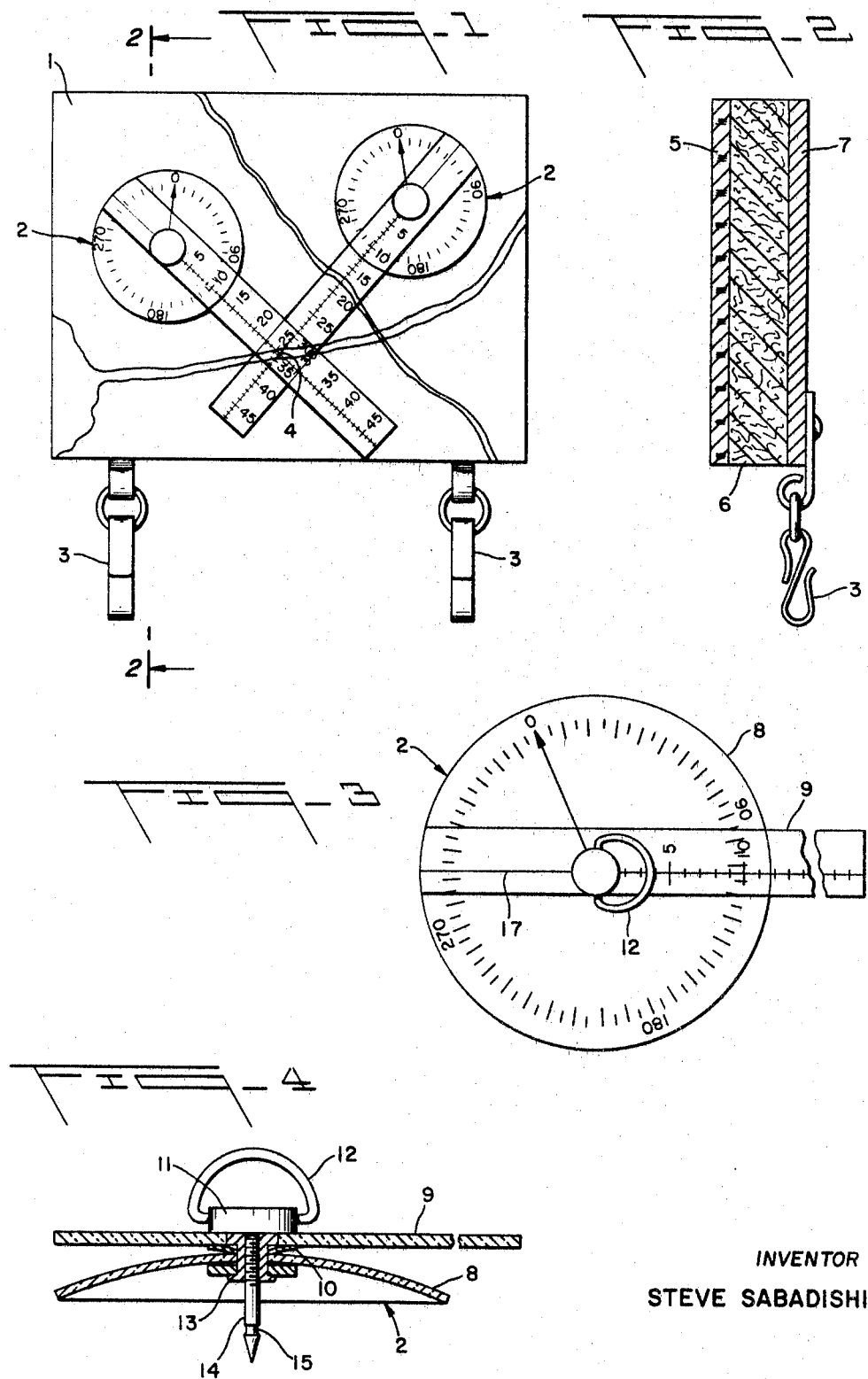
INVENTOR
STEVE SABADISHIN

United States Patent Office 3,387,372
Patented June 11, 1968

3,387,372
PICTORIAL PLOTTING BOARD AND
RELATED PLOTTING DEVICE
Steve Sabadishin, 1165 U.S. Rte. 22,
North Plainfield, N.J. 07060
Filed July 19, 1965, Ser. No. 473,133
5 Claims. (Cl. 33—76)

ABSTRACT OF THE DISCLOSURE

On an inflight lap-held plotting board is placed a navigational map, and upon the map a plotting device including a transparent plastic compass rose having a dished configuration, a linear scale member mounted upon the compass rose for selective rotation relative thereto, and a pin for affixing the compass rose to the plotting board and map, with the dished configuration being deflected to establish a frictional force between the compass rose and the map for securing the compass rose against movement relative to the map during deliberate rotation of the linear scale member.

---

The present invention relates to a pictorial plotting board and related plotting device for use as an inflight and preflight aid to navigation.

The present method of VHF navigation will allow the pilot of an aircraft to fly to or away from a VOR ground station on any desired course (known as on-course navigation). However, in order to determine the aircraft's position, it is necessary to obtain a cross reference bearing from a second VOR station and plot this on a navigational map. To accomplish this in a cockpit while flying the aircraft at the same time is a rather cumbersome task. It is an object of this invention to supply the pilot with a pictorial plotter which will alleviate the work load in the cockpit, allow the pilot to continuously update his present position with very little effort, see his present pictorial position on a map and obtain a direct reading of his distance to either of two VOR stations.

Another object of this invention is to allow the pilot of an aircraft to fly off-course; that is, any desired course for example between two VOR stations. Since the aircraft's present position is at the intersection of the two plotting scales which represent the cross reference bearing of the aircraft from two VOR's course corrections due to drift can easily be accomplished and a precision off-course flown.

A further object of this invention is to allow the pilot to measure accurate distance increments along his course for the purpose of timing these distance increments and calculating ground speed. Instead of looking down at the ground to determine distance increments by recognizing check points with respect to a map and then determining the distance increment, the pilot can use this invention (pictorial plotter) in conjunction with his VOR receiver to obtain precise distance measurements with respect to time.

A further object is to provide an inflight plotting board that can be fastened to the pilot's safety belt and have a surface sufficiently hard to be able to support the drawing and writing associated with the pilot's duties on paper maps and further having the characteristics of a bulletin board to allow the individual plastic plotters to pin the map to the plotting board.

A further object is to provide a plotting device containing a compass rose and pin arrangement such that when pinned into the companion plotting board (bulletin board fashion), and pressure is applied to set the pin, the compass rose, due to its construction, will exhibit sufficient frictional torque so as to prevent its rotation after being set to coincide with the magnetic north of the VOR station over which the compass rose is pinned. Further, the linear scale portion of the plotting device is free to rotate but is sufficiently restrained by a spring so as to prevent its inadvertent movement due to the normal vibrations and attitudes of the aircraft.

A further object is to be able to replace the existing linear scale, while retaining the same compass rose, with a linear scale of a different scale factor in order to accommodate different navigational maps.

A further object of this invention is to use the plotting board and plotting device in the corollary mode. Instead of using the aircraft bearings from a VOR station, as derived by the VHF (omni) receivers in the aircraft, to locate the pictorial position of the aircraft, it is possible to use the plotting device to measure the bearing of a prominent landmark on the map with respect to a VOR station. If the aircraft is later flown over this landmark, then the instantaneous aircraft VOR (omni) receiver derived bearing should agree with the plotted derived bearing. Any discrepancy between the two bearings will indicate that the aircraft's VOR (omni) receiver is in error. This can be accomplished at any time during the flight; therefore, the pilot has an indispensable tool for checking the validity of his navigational data as derived in the aircraft.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a plan view of the lap held plotting board, associated plotting device, map and safety belt fastening hooks of the present invention;

FIG. 2 is a cross-sectional view of the plotting board taken along line 2—2 of FIG. 1 and showing its construction essentials;

FIG. 3 is a plan view of one of the complementary plotting devices (of which two are required); and FIG. 4 is a sectional view of the plotting device embodied in this invention showing the detail construction of the compass rose and body, pin construction, cap and handle, linear scale attachment and pivoting arrangement.

Referring generally to the drawings, for illustrative purposes there are shown in FIG. 1 a complete flight board and two pictorial plotters to be used independently with respect to two VOR stations. Their intersection point being the present position of the aircraft as viewed on an aeronautical navigation map.

Referring again to FIG. 1, and FIG. 2, the plotting board is constructed to be held on the pilot's lap by securing hooks 3 to the pilot's safety belt. The portions 5, 6 and 7 are respectively, cork, a paper base resilient product and a hard smooth surface such as tempered Masonite bonded together to form a laminated structure.

The plastic plotters 2 are positioned, by virtue of their pin construction, bulletin board fashion, over the center of the VOR station. The compass rose 8 of FIG. 3 is rotated until the zero arrow is made to coincide with the magnetic north of the VOR station. The scale portion 9 of the plotter by reference to lubber line 17 is then moved to coincide with the aircraft's magnetic bearing with respect to the VOR station. The bearing information is obtained from the omni receiver in the aircraft. When both plotters are set as described above with respect to two independent VOR stations, the intersection 4 (see FIG. 1) of the plotter scales will represent the geographical pictorial position of the aircraft. The mileage scales can then be read to give the aircraft's distance to each VOR.

The construction of the plotting board, FIGS. 1 and 2, and the plotter pin and compass rose, FIG. 4, complement each other with respect to materials to produce the maximum coefficient of friction so that when the compass rose is set bulletin board fashion into the plotting board with the map sandwiched between the compass rose and the plotting board, the frictional torque produced at the rim of the compass rose 8, is sufficiently large to prevent rotation of the compass rose when the scale 9 is rotated.

Referring to FIG. 4, it will be noted that the construction of the compass rose is dished such that only its edge is in contact with the paper nagivational map. The thickness of the compass rose also is such that when pressure is applied to the cap 11 (FIG. 4) a spring action is attained and the pin 14 (FIG. 4) is driven deeper into the plotting board material. The groove 15 allows the plotting board resilient material to expand and trap the pin in position. This, together with the spring constant of the compass rose material, produces a force, which force acts at the rim of the compass rose to produce the maximum frictional torque.

Spring 10, FIG. 4, adds sufficient frictional force to prevent scale 9 from moving due to normally encountered aircraft vibrations.

Handle 12, FIG. 4, allows the plotter scale to be conveniently withdrawn from the plotting board. This handle is movable and can be stowed in a horizontal position to allow passage of one plotter scale over the top of the other such as when the cross reference bearing coincides with the second VOR.

Referring to FIG. 4, the construction of the plotter is such that scale 9 may be easily replaced by using the handle 12 to unscrew cap 11 with respect to housing 13 in order to accommodate other map scale factors.

With respect to the readability and setting of the plotter, the pilot is very familiar with the compass rose associated on standard Coast and Geodetic aeronautical maps and in many instances a portion of the compass rose is not printed. The present plotter will alleviate this problem and allow the pilot to transfer his omni receiver bearing information with the plotter scale lubber line 17, FIG. 3, and with reference to the plotter compass rose.

Any standard VHF receiver equipment in the aircraft with an omni converter head, consisting of a "left-right" indicator, a "to-from" indicator and a course selector, may be utilized to obtain the information required to plot the aircraft's position by virtue of this pictorial plotter. Two receivers and related equipment as mentioned above would further reduce the pilot's work load and are desirable but not essential. However, it is becoming more commonplace in today's aircraft to find more than one VHF receiver and associated equipment. For example, if two such VHF receivers are available, one such receiver can be turned to the omni station (VOR#1) toward which or away from which the aircraft is flying; while the second receiver is tuned to a second VOR station (VOR#2) off to one side of the course line. Cross reference bearing can then be taken more expeditiously since the pilot does not have to repeatedly retune his receivers. All that is required is for the pilot to fly the left-right needle of VOR#1 and by resetting the course selector of VOR#2 so that its left-right needle reads zero to obtain the cross reference bearing of the aircraft with respect to VOR#2.

In the same manner, the pilot may time discrete distance increments by dialing the advance course angle with respect to VOR#2 for a discrete distance such as ten miles. When the left-right needle of VOR#2 reads zero, then the aircraft has traveled a discrete distance along the course line and if this distance is accurately timed, then the resultant ground speed calculation will result in the most accurate ground speed method available today, utilizing standard VHF equipment and without having to rely on ground check points.

Various modifications may suggest themselves to those skilled in the art without departing from the spirit of my invention, and hence, I do not wish to be restricted to the specific forms shown or uses mentioned, except to the extent indicated in the appended claims.

I claim:

1. In an inflight plotting apparatus including a plotting board upon which is placed a separate navigational map, a plotting device comprising:
   a transparent resilient plastic compass rose having a central axis and an outer perimeter and being dished such that the portion through which the central axis passes is elevated above the outer perimiter when the outer perimeter is placed upon the map;
   a linear scale member mounted upon the compass rose for selective rotation with respect thereto;
   restraining means operatively engaging the linear scale member and the compass rose for preventing inadvertent movement of the linear scale member with respect to the compass rose; and
   securing means projecting from the compass rose along the central axis thereof and adapted to be pushed manually into the plotting board to pierce and frictionally engage and cooperate with the plotting board for removably affixing the compass rose to the plotting board with the map placed between the outer perimeter of the compass rose and the plotting board, said cooperation of the securing means with the plotting board serving to resiliently deflect the dished compass rose in a direction along the central axis toward the plotting board and establish a frictional force between the outer perimeter and the map for securing the compass rose against inadvertent movement relative to the map during deliberate rotation of the linear scale member against the restraint of said restraining means.

2. The plotting device of claim 1 wherein said securing means includes a pin mounted upon the compass rose and extending along the central axis thereof, said pin having a point for piercing the map and entering the plotting board, and a groove spaced from the point for cooperating with the material of the plotting board when the pin is embedded therein to secure the pin in place within the plotting board against the axial force esablished by the resilient deflection of the compass rose.

3. The plotting device of claim 1 including means mounting the linear scale member upon the compass rose for selective removal and replacement to allow the ready substitution for the linear scale member of another linear scale member having a different scale factor.

4. An inflight plotting apparatus comprising:
   a plotting board constructed, at least in part, of a resilient material and having a surface for receiving a separate navigational map; and
   at least a pair of plotting devices, each of said devices including
   a transparent resilient plastic compass rose having a central axis and an outer perimeter and being dished such that the portion through which the central axis passes is elevated above the outer perimeter when the outer perimeter is placed upon the map;
   a linear scale member mounted upon the compass rose for selective rotation with respect thereto;
   restraining means operatively engaging the linear scale member and the compass rose for preventing inadvertent movement of the linear scale member with respect to the compass rose; and
   securing means projecting from the compass rose along the central axis thereof and adapted to be pushed manually into the plotting board to pierce and frictionally engage and cooperate with the plotting board for removably affixing the compass rose to the plotting board with the map placed between the outer perimeter of the compass rose and the surface of the plotting board to resiliently deflect the dished compass rose in a direction along the central axis toward the plotting board and establish a frictional force between the outer perimeter and the map for securing the compass rose against inadvertent movement relative to the map during deliberate rotation of the linear scale member against the restraint of said restraining means.

5. The plotting apparatus of claim 4 wherein the securing means of each plotting device includes a pin mounted upon the compass rose and extending along the central axis thereof, said pin having a point for piercing the map and entering the resilient material of the plotting board, and a groove spaced from the point for cooperating with the resilient material of the plotting board when the pin is embedded therein to secure the pin in place within the plotting board against the axial force established by the resilient deflection of the compass rose.

References Cited

UNITED STATES PATENTS

| | | | |
|---|---|---|---|
| 1,327,154 | 1/1920 | Golden | 33—27 |
| 1,930,478 | 10/1933 | Jones | 33—1 |
| 2,278,440 | 4/1942 | Graves | 33—75 |
| 2,546,888 | 3/1951 | Duffin | 33—1 |
| 2,674,804 | 4/1954 | Reinhardt | 235—61 |
| 2,711,030 | 6/1955 | Drew et al. | 33—137 |
| 2,930,129 | 3/1960 | Richardson | 33—1 |

FOREIGN PATENTS

| | | |
|---|---|---|
| 344,256 | 11/1921 | Germany. |
| 123,886 | 1/1949 | Sweden. |

ROBERT B. HULL, *Primary Examiner.*